United States Patent
Horigome et al.

(10) Patent No.: US 11,861,956 B2
(45) Date of Patent: Jan. 2, 2024

(54) EXTERNAL ENVIRONMENT RECOGNITION APPARATUS FOR MOBILE BODY

(71) Applicant: MAZDA MOTOR CORPORATION, Hiroshima (JP)

(72) Inventors: Daisuke Horigome, Hiroshima (JP); Daisuke Hamano, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 98 days.

(21) Appl. No.: 17/613,948

(22) PCT Filed: Mar. 16, 2020

(86) PCT No.: PCT/JP2020/011403
§ 371 (c)(1),
(2) Date: Nov. 24, 2021

(87) PCT Pub. No.: WO2020/246104
PCT Pub. Date: Dec. 10, 2020

(65) Prior Publication Data
US 2022/0230489 A1 Jul. 21, 2022

(30) Foreign Application Priority Data
Jun. 7, 2019 (JP) ................................. 2019-106940

(51) Int. Cl.
*G07C 5/08* (2006.01)
*B60R 1/22* (2022.01)
(Continued)

(52) U.S. Cl.
CPC .............. *G07C 5/0866* (2013.01); *B60R 1/22* (2022.01); *B60R 11/04* (2013.01); *G06V 20/58* (2022.01);
(Continued)

(58) Field of Classification Search
None
See application file for complete search history.

(56) References Cited

U.S. PATENT DOCUMENTS 11,151,192 B1 * 10/2021 Campbell ................ H04N 7/18
2016/0063331 A1 * 3/2016 Tsai ......................... G06F 16/71
348/148

(Continued)

FOREIGN PATENT DOCUMENTS

EP 2393295 A1 12/2011
JP 7-304473 A 11/1995
(Continued)

OTHER PUBLICATIONS

Extended European search report dated May 25, 2022, in corresponding European patent Application No. 20819204.7, 11 pages.
(Continued)

*Primary Examiner* — Rebecca A Volentine
(74) *Attorney, Agent, or Firm* — XSENSUS LLP

(57) ABSTRACT

In a device (1) for recognizing an external environment of a moving body, an image processing unit (10) generates image data indicating the external environment of the moving body. Using this image data, object data indicating an object around the moving body is generated. At an occurrence of a predetermined event, a control unit (30) records the generated object data in a recording device (35), whereas the image processing unit (10) records, in another recording device (15), the image data corresponding to the object data recorded in the recording device (35). The time information generation unit (40) adds the same time information to the recorded object data and image data.

8 Claims, 4 Drawing Sheets

(51) Int. Cl.
  *G06V 20/58*   (2022.01)
  *B60R 11/04*   (2006.01)
(52) U.S. Cl.
  CPC ..... *B60R 2300/105* (2013.01); *B60R 2300/30* (2013.01)

(56) References Cited

U.S. PATENT DOCUMENTS

| | | |
|---|---|---|
| 2018/0190046 A1 | 7/2018 | Levinson et al. |
| 2018/0357484 A1 | 12/2018 | Omata |

FOREIGN PATENT DOCUMENTS

| | | |
|---|---|---|
| JP | 2004-224105 A | 8/2004 |
| JP | 2005-115932 A | 4/2005 |
| JP | 2011-114850 A | 6/2011 |
| JP | 2013-80518 A | 5/2013 |
| JP | 2017-503300 A | 1/2017 |

OTHER PUBLICATIONS

International Search Report and Written Opinion dated Jun. 9, 2020, received for PCT Application PCT/JP2020/011403, Filed on Mar. 16, 2020, 9 pages including English Translation.

\* cited by examiner

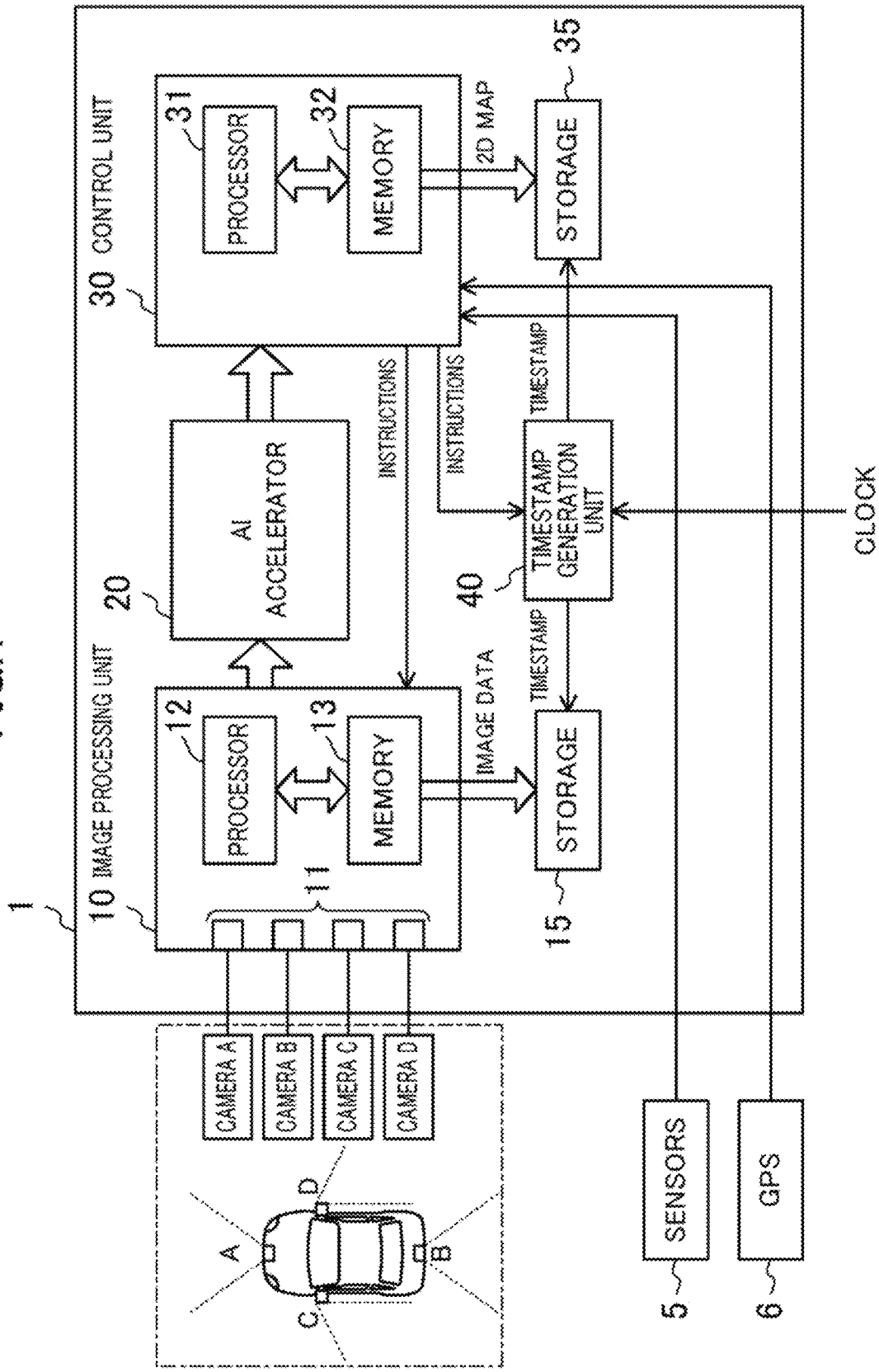

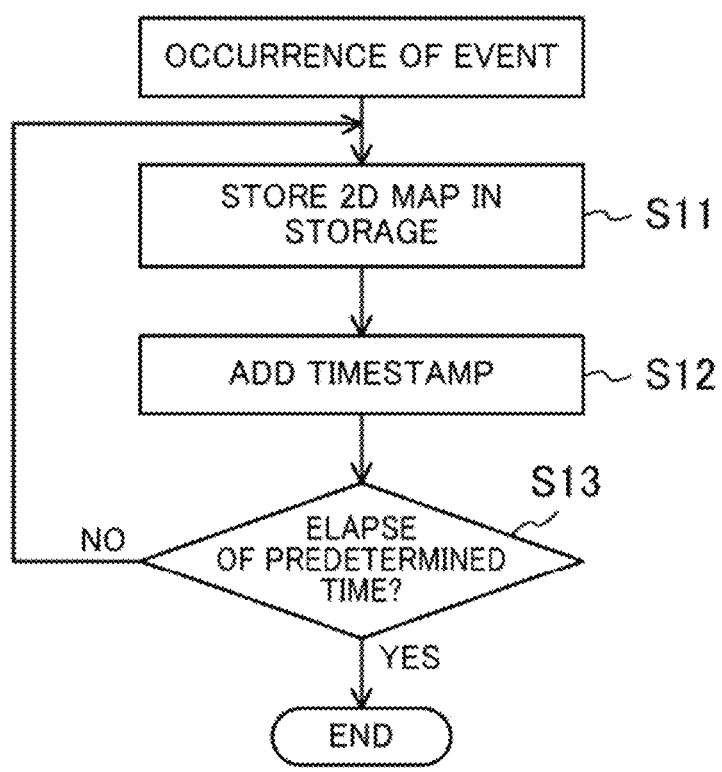

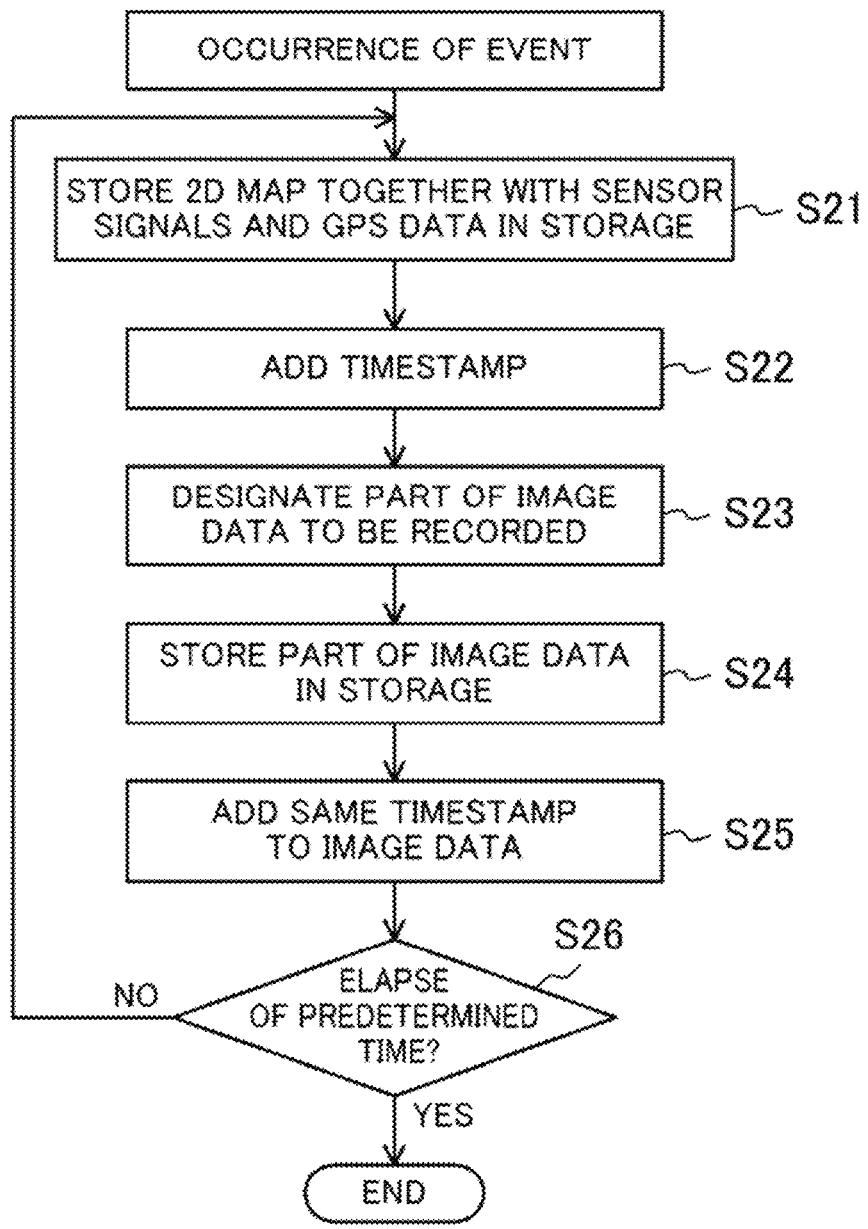

EXTERNAL ENVIRONMENT RECOGNITION APPARATUS FOR MOBILE BODY

CROSS-REFERENCE TO RELATED APPLICATIONS

The present application is based on PCT filing PCT/JP2020/011403, filed Mar. 16, 2020, which claims priority to JP 2019-106940, filed Jun. 7, 2019, the entire contents of each are incorporated herein by reference.

TECHNICAL FIELD

The present disclosure relates to a device for recognizing the external environment of a moving body such as a vehicle or a robot, and particularly to the technique of recording data indicating the external environment, at an occurrence of an event.

BACKGROUND ART

Each of Patent Documents 1 and 2 discloses a technique related to what is called a "dashboard camera." Patent Document 1 discloses an on-board moving image data recording device. This device records moving image data captured by cameras, at a normal image quality during normal traveling, and at a high image quality immediately before and after an accident. Patent Document 2 discloses a file allocation table (FAT) file system used in a device for storing multimedia data collected from the surroundings of a vehicle.

CITATION LIST

Patent Documents

Patent Document 1: Japanese Unexamined Patent Publication No. 2013-80518
Patent Document 2: Japanese Unexamined Patent Publication (Japanese Translation of PCT Application) No. 2017-503300

SUMMARY OF THE INVENTION

Technical Problem

For example, an autonomous driving system of a vehicle generally includes a device that obtains image data indicating the situation around the vehicle, using cameras in the vehicle, and recognizes the external environment of the vehicle based on the obtained image data. Besides the vehicle, for example, an autonomous body such as a robot includes a device that recognizes the external environment from outputs of cameras in the moving body.

Such a device may generate object data indicating objects around the moving body from the image data. At an occurrence of an event, the device fulfils the function as a dashboard camera by recording this object data together with the image data. In this case, however, different processing or recording times makes it difficult to verify the matching between the image data and the object data, which degrades the reliability in event verification.

The present disclosure was made in view of the problem. It is an object of the present disclosure to achieve highly reliable verification on an external environment at an occurrence of an event, using a device for recognizing the external environment of a moving body.

Solution to the Problems

Specifically, the present disclosure is directed to a device for recognizing an external environment of a moving body. The device includes: an image processing unit configured to execute image processing on an output of a camera placed in the moving body, and generate image data indicating the external environment of the moving body; a recognition processing unit configured to execute processing of recognizing the external environment of the moving body using the image data generated by the image processing unit; a control unit configured to generate object data indicating an object around the moving body, using a result of the processing by the recognition processing unit; a first recording device connected to the control unit and capable of recording the object data; a second recording device connected to the image processing unit and capable of recording the image data; and a time information generation unit configured to generate time information. The control unit records the object data generated, in the first recording device, and instructs the image processing unit to record, in the second recording device, the image data corresponding to the object data recorded in the first recording device, at an occurrence of a predetermined event. The time information generation unit adds same time information to the object data recorded in the first recording device and the image data recorded in the second recording device.

With this configuration, the device for recognizing the external environment of the moving body generates the image data indicating the external environment of the moving body, and generates the object data indicating the object around the moving body, using this image data. Here, the "object" includes a moving object, a fixed object, or an environment, for example, around the moving body. The "object data" is abstracted by adding information such as the position, type, and moving speed in the case of a moving object, to the object and discarding other specific information. At an occurrence of a predetermined event, the control unit records the generated object data in the first recording device connected to the control unit. The image processing unit records, in the second storage, the image data corresponding to the object data recorded in the first storage. The same time information is added to the object data recorded in the first recording device and the image data recorded in the second recording device. This allows highly reliable verification on the external environment of the moving body at an occurrence of an event, using the recorded object data and image data.

The time information generation unit is located inside the control unit.

The time information generation unit generates the time information in synchronization with a control clock of an actuator in the moving body.

With this configuration, the time information added to the object data and image data to be recorded is generated in synchronization with the control clock of the actuator. This further improves the reliability in verification at an occurrence of an event.

When instructing the image processing unit to record the image data, the control unit designates a part of the image data to be recorded corresponding to the object data recorded in the first recording device, using the result of the processing by the recognition processing unit. The image processing unit records, in the second recording device, the part of the image data designated by the control unit.

With this configuration, the control unit designates the part of the image data to be recorded corresponding to the recorded object data, using the result of the processing by the recognition processing unit. The image processing unit records, in the second recording device, the part of the image data designated by the control unit. This reduces the amount of the recorded image data, whereby the recording device requires a smaller recording capacity.

The image processing unit receives outputs of a plurality of cameras. When instructing the image processing unit to record the image data, the control unit designates one(s) of the cameras that capture(s) an image(s) to be recorded. The image processing unit records, in the second recording device, the image data captured by the one(s) of the cameras designated by the control unit.

With this configuration, the control unit designates one(s) of the cameras for capturing the images to be recorded. The image processing unit records, in the second recording device, the image data of the camera(s) designated by the control unit. This reduces the amount of the recorded image data, whereby the recording device requires a smaller recording capacity.

A time period of the image data recorded in the second recording device is shorter than a time period of the object data recorded in the first recording device.

With this configuration, the time period of the image data recorded in the second recording device is shorter than that of the object data recorded in the first recording device. This reduces the amount of the recorded image data, whereby the recording device requires a smaller recording capacity.

Advantages of the Invention

The present disclosure allows verification on the external environment of the moving body at an occurrence of an event, using the recorded object data and image data. Accordingly, highly reliable verification is possible.

BRIEF DESCRIPTION OF THE DRAWINGS

FIG. 1 shows a system configuration example of a device for recognizing the external environment of a moving body according to an embodiment.

FIG. 3 shows an operation example of the device shown in FIG. 1 at an occurrence of an event.

FIG. 4 shows another operation example of the device shown in FIG. 1 at an occurrence of an event.

DESCRIPTION OF EMBODIMENTS

Figure 2A:
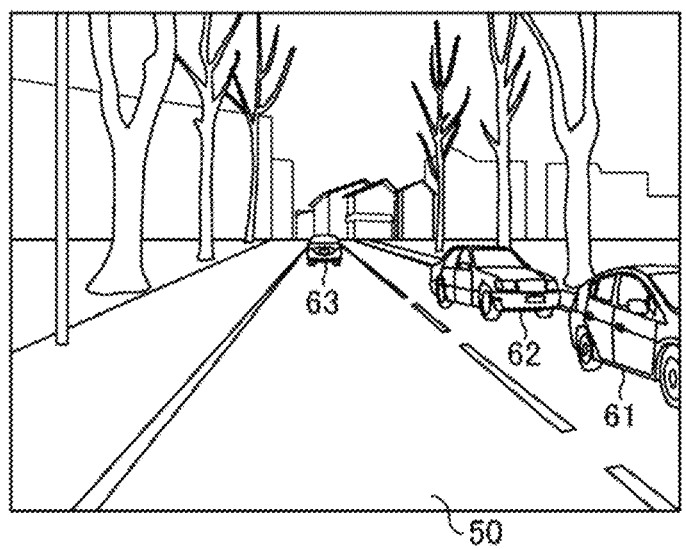
FIG. 2A shows an example of image data.

FIG. 1 is a block diagram showing an example of the system configuration of a vehicle travel control device according to an embodiment. The vehicle travel control device 1 in FIG. 1 receives, as inputs, various signals and data related to a vehicle, and executes arithmetic processing based on these signals and data using a model trained by deep learning, for example, to generate a travel route of the vehicle. The vehicle travel control device 1 in FIG. 1 is an example of the device for recognizing the external environment of a moving body according to the present disclosure.

The vehicle travel control device 1 in FIG. 1 includes an image processing unit 10, an AI accelerator 20, and a control unit 30. The image processing unit 10 includes an input port 11 that receives outputs of cameras placed in the vehicle, a processor 12 for predetermined image processing on the camera outputs, and a memory 13 that stores image signals, for example, generated by the processor 12. The image processing unit 10 generates image data indicating the external environment of the vehicle based on the outputs of the cameras placed in the vehicle. Here, four cameras A to D are placed in the vehicle. The camera A is placed at the front of the vehicle and captures images in front of the vehicle. The camera B is placed at the rear of the vehicle and captures images behind the vehicle. The cameras C and D are placed on respective sides of the vehicle and capture images beside the vehicle. The image data generated by the image processing unit 10 is transferred to the AI accelerator 20 via PCI Express, for example. In addition, the generated image data is temporarily stored in the memory 13. In the memory 13, the image data is always written, among which the oldest data is sequentially deleted and the newest data is overwritten.

The AI accelerator 20 performs arithmetic processing on the image data transferred from the image processing unit 10, using a model trained by deep learning, for example. The AI accelerator 20 generates a three-dimensional (3D) map representing the external environment of the vehicle, for example. The 3D map shows, for example, moving objects such as other vehicles, bicycles, and pedestrians; fixed objects such as traffic lights and signs; road shapes; and white lines; around the vehicle. Vehicles, bicycles, and pedestrians, traffic lights, signs, road shapes, and white lines are examples of the object in the case where the moving object is a vehicle. The generated 3D map data is transferred to the control unit 30 via PCI Express, for example. The AI accelerator 20 is an example of the recognition processing unit for the processing of recognizing the external environment of the vehicle.

The control unit 30 includes a processor 31 and a memory 32. The control unit 30 receives the signals output from sensors 5 such as radars or a vehicle speed sensor in the vehicle, and global positioning system (GPS) data transmitted from a GPS 6. The control unit 30 creates a two-dimensional (2D) map based on the 3D map data transmitted from the AI accelerator 20. The control unit 30 generates a travel route of the vehicle based on the generated 2D map. The control unit 30 determines a target motion of the vehicle for the generated traveling route, and calculates a driving force, a braking force, and a steering angle for achieving the determined target motion. In addition, the generated 2D map data is temporarily stored in the memory 32 at least until the generation of the travel route. In the memory 32, the 2D map data is always written, among which the oldest data is sequentially deleted and the newest data is overwritten.

Figure 2B:
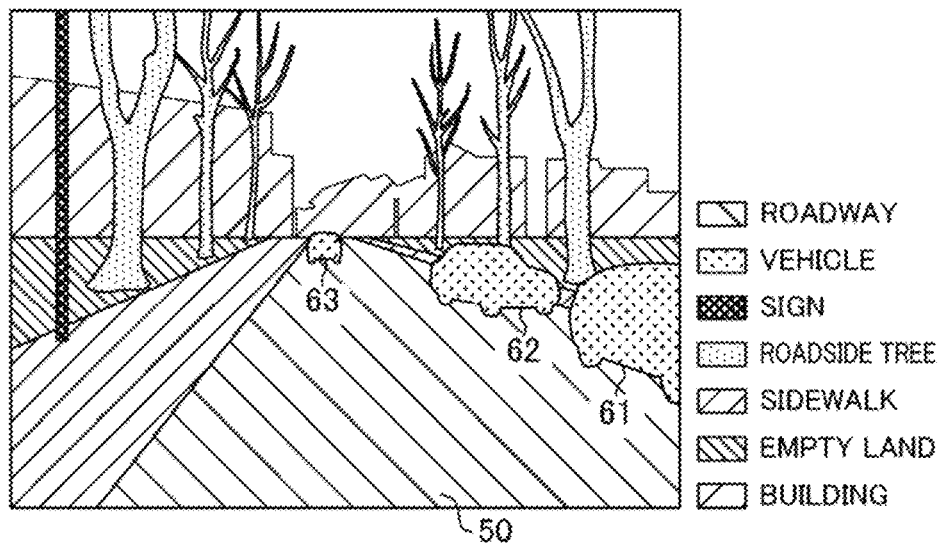
FIG. 2B shows an example of a 3D map.
Figure 2C:
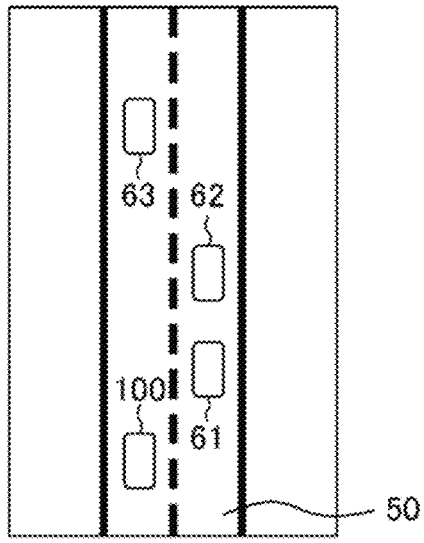
FIG. 2C shows an example of a 2D map.

FIG. 2A to 2C show images representing examples of data generated by the travel route control device shown in FIG. 1. FIG. 2A shows an example of the image data generated by the image processing unit 10. FIG. 2B shows an example of the 3D map created by the AI accelerator 20. FIG. 2C shows an example of the 2D map created by the control unit 30. The image data in FIG. 2A is generated based on outputs of the camera A at the front of the vehicle, and shows vehicles 61, 62, and 63 traveling on a roadway 50. In the 3D map in FIG. 2B, attribute information on each image area is added including the roadway 50 and the vehicles 61, 62, and 63. The 2D map in FIG. 2C shows the vehicles 61, 62, and 63 traveling on the roadway 50 and a host vehicle 100. Added to each of the vehicles 61, 62, and 63 is the information on the direction and the distance from the host vehicle 100, the object type, that is, a vehicle, and the moving speed. Note that the 2D map data has a significantly smaller amount than image data. The 2D map data is an example of the object data indicating objects around the vehicle.

The vehicle travel control device 1 of FIG. 1 further includes storages (i.e., recording devices) 15 and 35, and a timestamp generation unit 40. The storage 15 is connected to the image processing unit 10 and is capable of recording the image data generated by the image processing unit 10. Upon receipt of instructions from the control unit 30, the processor 12 of the image processing unit 10 stores, in the storage 15, the image data stored in the memory 13. The storage 35 is connected to the controller 30 and is capable of recording the 2D map data generated by the control unit 30. At an occurrence of a predetermined event, the processor 31 of the control unit 30 stores, in the storage 35, the 2D map data stored in the memory 32. The storages 15 and 35 are hard disks or flash memories, for example.

Upon receipt of instructions from the control unit 30, the timestamp generation unit 40 generates timestamps. The timestamps are here examples of the time information indicating the times of generating the data. The timestamp generation unit 40 generates the timestamps in synchronization with a clock used to control an actuator in the vehicle, for example. The generated timestamps are added to the image data stored in the storage 15 or the 2D map data stored in the storage 35.

Here, the predetermined event is, for example, an approach of another vehicle to the vehicle, sudden braking, detection of an impact. An occurrence of the predetermined event is detected from, for example, the outputs of the sensors 5, such as the radars, an impact sensor, or a brake detection sensor, in the vehicle. Alternatively, the control unit 30 may detect an occurrence of an event in the processing of generating the travel route. Alternatively, an occurrence of an event may be detected from the outputs of sensors outside the vehicle, such as on a road shoulder or at an intersection. An occurrence of an event may be detected by communications with another vehicle.

The image processing unit 10, the AI accelerator 20, and the control unit 30 are, for example, semiconductor chips independent from each other. Alternatively, two or more of the image processing unit 10, the AI accelerator 20, and the control unit 30 may be integrated in a single chip. For example, the image processing unit 10 and the AI accelerator 20 may be integrated in a single semiconductor chip for recognition processing. The timestamp generation unit 40 may be located inside the control unit and fulfils a part of the function of the control unit 30. Alternatively, the timestamp generation unit 40 may be separated from the control unit 30. The storages 15 and 35 may be separate hardware, or may be divided into different recording areas in common hardware.

Now, operation examples of the vehicle travel control device 1 of FIG. 1 at an occurrence of a predetermined event will be described.

Operation Example 1

FIG. 3 is a flowchart showing an operation example of the vehicle travel control device 1 according to the present embodiment at an occurrence of an event. As shown in FIG. 3, at an occurrence of a predetermined event, the control unit 30 stores the generated 2D map data in the storage 35 (S11). Specifically, the control unit 30 outputs, to the storage 35, the 2D map data temporarily stored in the memory 32 for route generation. Accordingly, the 2D map data starts being recorded slightly before the occurrence of the event. Upon receipt of instructions from the control unit 30, the timestamp generation unit 40 generates a timestamp. The generated timestamp is added to the 2D map data stored in the storage 35 (S12).

The recording of the 2D map data and the addition of the timestamp are repeatedly executed until a predetermined time elapses after the occurrence of the event (S13). As a result, the 2D map data before and after the occurrence of the predetermined event can be recorded, together with the timestamps, in the storage 35.

In this operation example 1, since the image data generated by the image processing unit 10 is not recorded, the storage 15 may be omitted from the device configuration.

Operation Example 2

FIG. 4 is a flowchart showing another operation example of the vehicle travel control device 1 according to the present embodiment at an occurrence of an event. As shown in FIG. 4, at an occurrence of a predetermined event, the control unit 30 stores the generated 2D map data in the storage 35. At this time, the control unit 30 stores the sensor signals received from the sensors 5 and the GPS data received from the GPS 6, together with the 2D map data, in the storage 35 (S21). Upon receipt of instructions from the control unit 30, the timestamp generation unit 40 generates a timestamp. The generated timestamp is added to the 2D map data, the sensor signals, and the GPS data stored in the storage 35 (S22).

The control unit 30 instructs the image processing unit 10 to record the image data corresponding to the 2D map data recorded in the storage 35. At this time, the control unit 30 designates the part of the image data to be recorded (S23). That is, in this operation example 2, the part related to important information necessary for verification is cut out from the image data and recorded in the storage 15. The part related to the important information is, for example, a part showing other vehicles, pedestrians, bicycles, or other objects, or a part showing traffic lights or signs. The part of the image data to be recorded may be determined with reference to the 3D map data generated by the AI accelerator 20, for example. For example, if a part showing other vehicles is recorded, the area occupied by the other vehicles is specified out of the 3D map data. The coordinate range corresponding to the specified area in the image data is determined as the part to be recorded.

Upon receipt of instructions from the control unit 30, the image processing unit 10 stores the generated image data in the storage 15 (S24). Specifically, the image processing unit 10 stores, in the storage 15, the part designated by the control unit 30 out of the image data temporarily stored in the memory 13. Accordingly, the image data starts being recorded slightly before the occurrence of the event. Upon receipt of instructions from the control unit 30, the timestamp generation unit 40 adds the same timestamp as the 2D map data recorded in the storage 35 to the image data recorded in the storage 15 (S25).

The recording of the 2D map data, the sensor signals, the GPS data, and the image data and the addition of the timestamp are repeatedly executed until a predetermined time elapses after the occurrence of the event (S26). As a result, the 2D map data, the sensor signals, the GPS data, and the image data before and after the occurrence of the predetermined event are recorded, together with the timestamps, in the storages 15 and 35.

In the operation example 2, only one of the sensor signals or the GPS data may be recorded together with the 2D map data.

In the present embodiment, the vehicle travel control device 1 generates the image data indicating the external environment of the vehicle, and generates the 2D map data indicating the external environment of the vehicle, using this image data. At an occurrence of a predetermined event, the control unit 30 records the generated 2D map data in the storage 35 connected to the control unit 30. The image processing unit 10 records, in the storage 15, the image data corresponding to the 2D map data recorded in the storage 35. The same timestamps are added to the 2D map data stored in the storage 35 and the image data stored in the storage 15. This allows highly reliable verification on the external environment of the vehicle at an occurrence of an event, using the recorded 2D map data and image data.

Other Operation Examples

In the operation example 1, the timestamps are added to the 2D map data stored in the storage 35. In the operation example 2, the time stamps are added to the image data recorded in the storage 15 and the 2D map data, the sensor signals, and the GPS data recorded in the storage 35. Note that no timestamp may be added to the data stored in the storage 15 or 35. In this case, the time stamp generation unit 40 may be omitted from the device configuration.

In the operation example 2, a part of the image data is cut out and recorded in the storage 15. The configuration is not limited thereto. The whole image data may be recorded. In this case, the operation of designating the part of the image data to be recorded is unnecessary. However, by recording a part of the image data, the storage 15 requires a smaller recording capacity.

The image data of all the cameras in the vehicle is not necessarily recorded. The control unit 30 may designate one(s) of the cameras for capturing images to be recorded. For example, only the image data indicating the images in front of the vehicle captured by the camera A may be recorded, or only the image data indicating the images in front of the vehicle captured by the camera A and the images behind the vehicle captured by the camera B may be recorded. Specifically, when instructing the image processing unit 10 to record the image data, the control unit 30 may designate one(s) of the cameras for capturing the images to be recorded. The image processing unit 10 may record, in the storage 15, the image data of the camera(s) designated by the control unit 30. Accordingly, the storage 15 requires a smaller recording capacity.

The cameras for capturing image data to be recorded may be selected in accordance with the details of the event that has occurred. For example, if there is an approaching object in front of the vehicle, the image data of the camera A that captures the images in front of the vehicle may be recorded. If there is an approaching object behind the vehicle, the image data of the camera B that captures the images behind the vehicle may be recorded. In addition, the parts to be cut out from the image data may be changed in accordance with the details of the event that has occurred.

In the operation example 2, the period of storing the 2D map data may be different from the period of storing the image data. For example, the image data may be recorded only during an important period (e.g., three seconds before and after the occurrence) of an event. Before and after the important period, no image data may be recorded and only the 2D map data may be recorded. That is, the time period of the image data recorded in the storage 15 may be shorter than that of the 2D map data recorded in the storage 35. Accordingly, the storage 15 requires a smaller recording capacity.

Other Embodiments

An example has been described above in the embodiment where the vehicle travel control device 1 generates the travel route of the vehicle. The present disclosure is however not limited to a device for travel control. For example, the device only needs to generate image data based on camera outputs and generate 2D map data based on the image data. In this case, another device may perform the travel control of the vehicle using the generated 2D map data.

In the embodiment described above, the 2D map data is an example of object data indicating objects around a vehicle. Object data other than the 2D map data may be recorded at an occurrence of an event. For example, the 3D map data generated by the AI accelerator 20 may be recorded at an occurrence of an event.

In the embodiment described above, the present disclosure is applied to a vehicle, but is also applicable to a moving body such as a robot, an aircraft, and a ship, besides a vehicle. For example, if the moving body is a robot, a person, a pet, furniture, a wall, a door, a floor, or a window around the robot is an example of the object.

DESCRIPTION OF REFERENCE CHARACTERS

1 Vehicle Travel Control Device (Device for Recognizing External Environment of Moving Body)
10 Image Processing Unit
15 Storage (Recording Device)
20 AI Accelerator (Recognition Processing Unit)
30 Control Unit
35 Storage (Recording Device)
40 Timestamp Generation Unit (Time Information Generation Unit)

The invention claimed is:
1. A device for recognizing an external environment of a moving body, the device comprising:
an image processor configured to execute image processing on an output of a camera placed in the moving body, and to generate image data indicating the external environment of the moving body;
a recognition processor configured to execute processing of recognizing the external environment of the moving body using the image data generated by the image processor, and to generate three-dimensional (3D) map data representing the external environment of the moving body;
a control circuitry configured to generate two-dimensional (2D) map data indicating an object around the moving body, using the 3D map data generated by the recognition processor;
a first recording device connected to the control circuitry and capable of recording the 2D map data;
a second recording device connected to the image processor and capable of recording the image data; and
a time information generation circuitry configured to generate time information,
the control circuitry being configured to record the 2D map data generated, in the first recording device, and instruct the image processor to record, in the second recording device, the image data corresponding to the

2D map data recorded in the first recording device, at an occurrence of a predetermined event, the time information generation circuitry being configured to add same time information to the 2D map data recorded in the first recording device and the image data recorded in the second recording device.

2. The device of claim 1, wherein
the time information generation circuitry is located inside the control circuitry.

3. A device for recognizing an external environment of a moving body, the device comprising:

an image processor configured to execute image processing on an output of a camera placed in the moving body, aid generate image data indicating the external environment of the moving body;

a recognition processor configured to execute processing of recognizing the external environment of the moving body using the image data generated by the image processor;

a control circuitry configured to generate object data indicating an object around the moving body, using a result of the processing by the recognition processor;

a first recording device connected to the control circuitry and capable of recording the object data;

a second recording device connected to the image processor and capable of recording the image data; and a time information generation circuitry configured to generate time information, the control circuitry being configured to record the object data generated, in the first recording device, and instruct the image processor to record, in the second recording device, the image data corresponding to the object data recorded in the first recording device, at an occurrence of a predetermined event, the time information generation circuitry being configured to add same time information to the object data recorded in the first recording device and the image data recorded in the second recording device, wherein when instructing the image processor to record the image data, the control circuitry designates a part of the image data to be recorded corresponding to the object data recorded in the first recording device, using the result of the processing by the recognition processor, and the image processor records, in the second recording device, the part of the image data designated by the control circuitry.

4. The device of claim 3, wherein
the image processor receives outputs of a plurality of cameras, when instructing the image processor to record the image data, the control circuitry designates one(s) the cameras that capture(s) art image(s) to be recorded, and the image processor records, in the second recording device, the image data captured by the one(s) of the cameras designated by the control circuitry.

5. The device of claim 4, wherein
a time period of the image data recorded in the second recording device is shorter than a time period of the object data recorded in the first recording device.

6. A device for recognizing an external environment of a moving body, the device comprising:

an image processor configured to execute image processing on an output of a camera placed in the moving body, and generate image data indicating the external environment of the moving body;

a recognition processor configured to execute processing of recognizing the external environment of the moving body using the image data generated by the image processor;

a control circuitry configured to generate object data indicating an object around the moving body, using a result of the processing by the recognition processor;

a first recording device connected to the control circuitry and capable of recording the object data;

a second recording device connected to the image processor and capable of recording the image data; and a time information generation circuitry configured to generate time information, the control circuitry being configured to record the object data generated, in the first recording device, and instruct the image processor to record, in the second recording device, the image data corresponding to the object data recorded in the first recording device, at an occurrence of a predetermined event, the time information generation circuitry being configured to add same time information to the object data recorded in the first recording device and the image data recorded in the second recording device, wherein the time information generation circuitry is located inside the control circuitry, wherein when instructing the image processor to record the image data, the control circuitry designates a part of the image data to be recorded corresponding to the object data recorded in the first recording device, using the result of the processing by the recognition processor, and the image processor records, in the second recording device, the part of the image data designated by the control circuitry.

7. The device of claim 6, wherein
the image processor receives outputs of a plurality of cameras, when instructing the image processor to record the image data, the control circuitry designates one(s) of the cameras that capture(s) an image(s) to be recorded, and the image processor records, in the second recording device, the image data captured by the one(s) of the cameras designated by the control circuitry.

8. The device of claim 7, wherein
a time period of the image data recorded in the second recording device is shorter than a time period of the object data recorded in the first recording device.

* * * * *